US005623587A

United States Patent [19]

Bulman

[11] Patent Number: 5,623,587
[45] Date of Patent: Apr. 22, 1997

[54] METHOD AND APPARATUS FOR PRODUCING AN ELECTRONIC IMAGE

[75] Inventor: Richard L. Bulman, New York, N.Y.

[73] Assignee: Kideo Productions, Inc., New York, N.Y.

[21] Appl. No.: 489,564

[22] Filed: Jun. 12, 1995

Related U.S. Application Data

[63] Continuation-in-part of Ser. No. 138,531, Oct. 15, 1993, abandoned.

[51] Int. Cl.$^6$ .................................................. G06F 15/00
[52] U.S. Cl. .................................................. 395/135
[58] Field of Search ................................. 395/135, 155, 395/161; 345/113, 114

[56] References Cited

U.S. PATENT DOCUMENTS

| | | | |
|---|---|---|---|
| 4,007,487 | 2/1977 | Vlahos | 358/22 |
| 4,100,569 | 7/1978 | Vlahos | 358/22 |
| 4,261,012 | 4/1981 | Maloomian | 358/93 |
| 4,305,131 | 12/1981 | Best | 364/521 |
| 4,333,152 | 6/1982 | Best | 364/521 |
| 4,344,085 | 8/1982 | Vlahos | 358/22 |
| 4,346,403 | 8/1982 | Tamura | 358/93 |
| 4,445,187 | 4/1984 | Best | 364/521 |
| 4,481,412 | 11/1984 | Fields | 235/472 |
| 4,498,081 | 2/1985 | Fukushima et al. | 340/793 |
| 4,569,026 | 2/1986 | Best | 364/521 |
| 4,616,327 | 10/1986 | Rosewarene et al. | 364/518 |
| 4,841,575 | 6/1989 | Welsh et al. | 381/36 |
| 4,846,693 | 7/1989 | Baer | 434/308 |
| 4,987,552 | 1/1991 | Nakamura | 364/521 |
| 4,996,649 | 2/1991 | Kamei et al. | 364/518 |
| 5,086,480 | 2/1992 | Sexton | 382/118 |
| 5,091,849 | 2/1992 | Davis et al. | 395/100 |
| 5,117,407 | 5/1992 | Vogel | 369/30 |
| 5,119,080 | 6/1992 | Kajimoto et al. | 340/723 |
| 5,185,665 | 2/1993 | Okura et al. | 358/183 |
| 5,198,902 | 3/1993 | Richards et al. | 358/183 |
| 5,208,872 | 5/1993 | Fisher | 382/42 |
| 5,288,078 | 2/1994 | Capper et al. | 273/148 |
| 5,568,599 | 10/1996 | Yoshino et al. | 395/135 |

OTHER PUBLICATIONS

Lu, Shin–Yee & Johnson, Robert K., "A New True 3–D Motion Camera System from Lawrence Livermore", Advanced Imaging Jul. 1995, pp. 51–56.

*Primary Examiner*—Phu K. Nguyen
*Attorney, Agent, or Firm*—Furgang & Milde, LLP

[57] ABSTRACT

A method for producing a composite electronic image of a subject comprises the steps of converting a set of representations of the first images into an another set of representations of the first image which are dependent upon the size information defined by the representations of the foreground and background frames; and combining the converted images with the foreground image using the reference points. This method can also be used to combine the sound data and a sequence of frame images.

36 Claims, 12 Drawing Sheets

FIG.5A
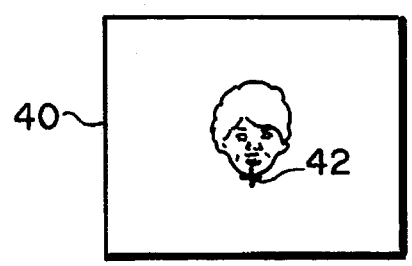
FIG.5B
FIG.6
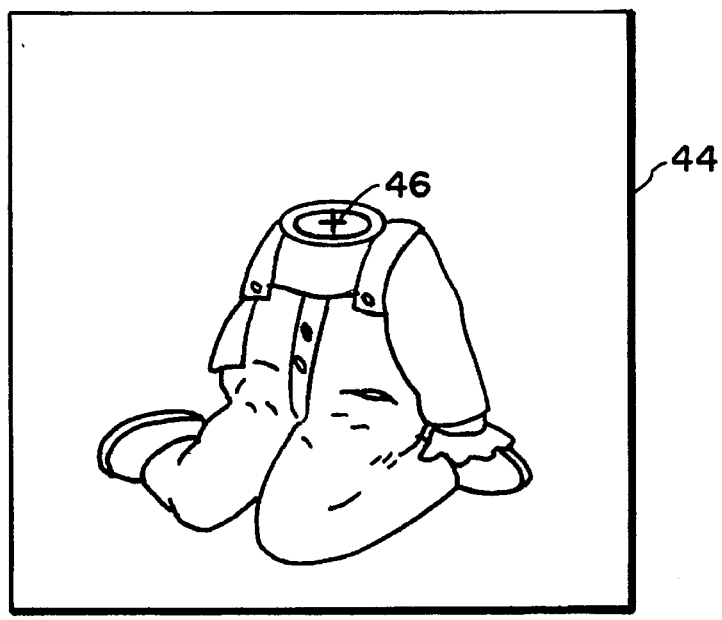
FIG.7
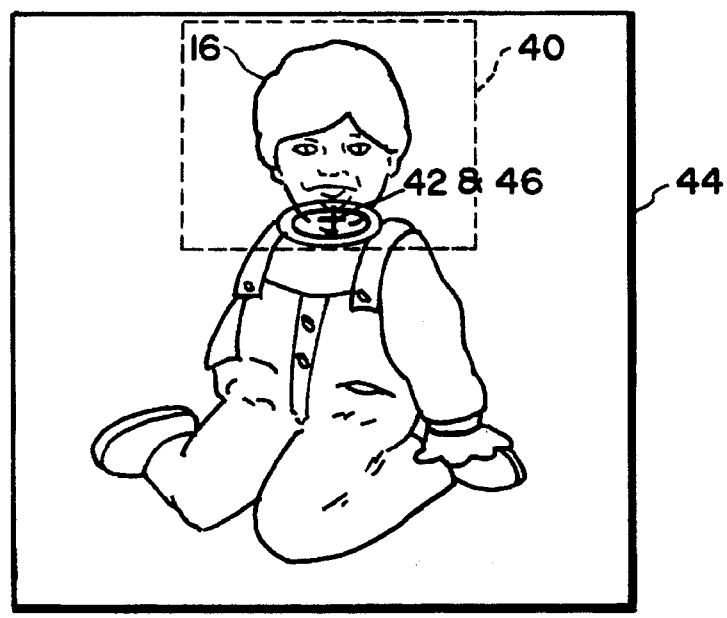

METHOD AND APPARATUS FOR PRODUCING AN ELECTRONIC IMAGE

REFERENCE TO RELATED APPLICATIONS

The present application is a Continuation-in-part of U.S. patent application Ser. No. 08/138,531, filed Oct. 15, 1993, now abandoned.

BACKGROUND OF THE INVENTION

The present invention relates to a method and apparatus for producing a series of electronic images of an animated figure having at least two body portions, wherein a first body portion from one source is automatically combined in anatomically appropriate fashion with a second body portion from the same or different source. The series of electronic images are then further combined with other images.

In the following description, the term "head" is intended to include not only the head of a human being with its hair (however long) face, ears, etc., but also any and all appurtenant accessories such as a hat, glasses, hair adornments, jewelry (earrings, etc.) and the like. The term "body" as it is used herein, is intended to include the body of a human being, animal, fish, etc., (either real or fictional, animated or photorealistic) including not only the torso, arms, legs, tail, fins, etc., but also any and all appurtenant clothing, shoes, jewelry, and the like. The image of the head and/or body may be obtained from a "real" head or body, respectively, either photographically or by electronic image scanning, or from an artistic or computer generated rendering thereof.

It is known to produce pictures of human subjects with the head of one human being superimposed upon the body of another human being, animal, fish, etc. This superposition is normally accomplished "mechanically" by cutting around the outline of the head of a person shown in a first photograph and applying this head, in the proper position and orientation, to a body in a second photograph. The resulting "mechanical" is thereafter photographed and/or scanned electronically to produce a third photograph or electronic image. Electronic implementation of this process is also known, where the head is electronically traced and superimposed.

This superposition process is time consuming and requires that the head and body in the first and second photographs, respectively, be adjusted in scale photographically; that is, that either the first or second photograph be enlarged or reduced so that the head and body are of the same relative size.

Consequently, this superposition process is only rarely used, and when used it is limited to situations where the cost of the process is small compared to the cost of the overall desired product.

Steir et al., U.S. Pat. No. 5,060,171 relates to a system for superimposing images. A video image of a head is captured. This image is apparently processed as a static single frame, and a separate hairstyle is overlayed with a translation and scaling transform. The system does not provide for dynamically merging a first image with a second image which changes. See also, U.S. Pat. No. 5,289,568.

SUMMARY OF THE INVENTION

It is a principal object of the present invention to provide a method and apparatus for producing an electronic image of an animated subject in which the head of one subject is automatically superimposed upon the body of another subject, which may be a person, animal, fish, etc.

It is a further object of the present invention to provide a method and apparatus for producing an electronic image of a combination of a head from one subject and a body from another subject, which is substantially less time consuming and less costly than the superposition process known heretofore.

These objects, as well as further objects which will become apparent from the discussion that follows, are achieved, in accordance with one embodiment of the present invention, by a method, and by apparatus for carrying out a method, which comprises the steps of:

(a) electronically inputting a first image of at least a portion of said subject and storing a set of first digital representations defining said first image in a foreground electronic image frame;

(b) generating a plurality of second images of a picture containing a remainder portion of said subject and storing a plurality of sets of second digital representations, each set defining one of said second images in a background electronic image frame;

(c) producing a set of third digital representations associated with said foreground frame defining (1) a first reference point on said foreground frame indicating the location of said subject portion in said foreground frame, and (2) the size of said subject portion in said foreground frame;

(d) producing a set of fourth digital representations associated with each of said background frames defining (1) a second reference point on each respective background frame specifying the desired position of said subject portion in said background frame, and (2) the desired size of said subject portion in each respective background frame;

(e) converting said set of first representations of said first image into a plurality of sets of fifth representations, in dependence upon the size information defined by said set of third representations and said plurality of sets of fourth representations, each set of said fifth representations defining said foreground frame with said subject portion scaled to said desired size and located at said desired position in a respective one of said background frames;

(f) combining said set of fifth representations defining said foreground frame upon said set of second representations defining said background frame such that said first and second reference points substantially coincide, to produce a plurality of sets of sixth digital representations, each defining a respective final electronic image frame containing said subject portion disposed upon said remainder of said subject at said desired position and with said desired size; and (g) storing said plurality of said sets of said sixth digital representations to provide a sequence of said final frames. Optionally, an accompanying sound sequence may be provided by:

(h) storing a sound sequence associated with said sequence of final frames; and (i) producing a video recording comprising said sequence of final flames and said associated sound sequence.

In accordance with a second embodiment of the present invention, a method and apparatus for carrying out a method, is provided which comprises the steps of:

(a) obtaining first image information relating to a first anatomical portion of a subject and producing a set of first representations of the first image;

(b) obtaining second image information relating to a second anatomical portion of a subject and producing a set of second representations of the second image defining a plurality of second image frames, the first anatomical portion being for placement adjacent the second anatomical portion;

(c) producing a set of third representations associated with the first image information defining (1) a first reference indicating a positioning of the first anatomical portion, and (2) a size of the first anatomical portion;

(d) determining a set of fourth representations associated with the plurality of second frames defining (1) a second reference on each of said second frames specifying the desired positioning for the first anatomical portion in said respective second frame, and (2) the desired size for the first anatomical portion in said respective second frame;

(e) converting the set of first representations of the first image into a set of fifth representations, in dependence upon the third and fourth representations, the fifth representations defining the first anatomical portion scaled to the desired size and with the desired positioning;

(f) merging the set of fifth representations with the set of second representations defining a respective second frame such that the first and second references substantially coincide, to produce a set of sixth representations defining a respective second image frame comprising the first anatomical portion disposed adjoining the second anatomical portion with the desired positioning and of the desired size; and (g) outputting the respective second image frame from the set of sixth representations.

Also provided is a method comprising the steps of:

(a) electronically scanning a first image of a head of said subject and producing a set of first digital representations of said first image defining a first electronic image frame;

(b) generating a plurality of second images containing a body for said subject and producing a set of second digital representations of said plurality of second images defining a plurality of second electronic image frames;

(c) producing a set of third digital representations associated with said first frame defining (1) a first reference point on said first frame indicating the given location of said head in said first frame, and (2) the size of said head in said first frame;

(d) producing a set of fourth digital representations associated with each of said plurality of second frames each respectively defining (1) a second reference point specifying a desired location of said head in said second frame, and (2) a desired size of said head in said second frame;

(e) converting said set of first representations of said first image into a set of fifth representations, in dependence upon the size information defined by said third and fourth representations, said fifth representations defining said first frame with head scaled to said desired size and located at said given position;

(f) merging said set of fifth representations defining said first frame with said set of second representations defining said plurality of second frames such that said first and second reference points substantially coincide, to produce a set of sixth digital representations defining a plurality of third image frames of a picture containing said head dynamically disposed upon each of said body portions of said second images at said desired location; and (g) outputting said plurality of third image frames from said set of sixth representations.

In the preferred embodiment according to the present invention, the first anatomical portion of a subject is a head and the second anatomical portion is a body, preferably derived from different sources, e.g., the head portion is from a different entity than the body portion. The first image information is obtained either through a video or electronic camera from scanning one or more still pictures. Alternatively, an artist may produce a drawing or caricature of the head and/or body portions, either directly with an electronic capture system or using standard artistic media which is later input into the computer system by scanning or other imaging process. The second image comprises an animated sequence, a videotape, a series of still scenes, or computer generated background scenes. The second image preferably has an anatomical adjoining part which allows normal appearing placement of the anatomical part of the first image, or includes a buffer zone which obscures misalignment or other visual artifacts from the merging process. Alternatively, the second image includes only the second anatomical portion, e.g., body, which is electronically joined with the first anatomical portion, e.g., head, and the joined first and second images are together superimposed on a background.

In general, an audio sequence will accompany the images, which will be a fixed sequence or a prototype sequence altered based on particular added information, such as a name, identification, or other contextual information. The audio sequence corresponds to the image sequence.

The resulting multimedia sequence will therefore include exemplar material in both the video and audio sequences, which has been modified and/or customized based on individualized inputs. Because the exemplar material may comprise the bulk of the production content, this system allows and facilitates customization of multimedia productions with a relatively small customization information input. Further, because the production may be modularized, with one or more levels of customization, a high degree of flexibility is available for relatively low cost per custom multimedia production. Thus, each output multimedia production may include a selected subset of the available exemplar material.

In forming the customized image, a subject foreground image portion, such as a head, will be provided in electronic form to a computerized system. This subject foreground image portion will then be matched to another subject portion, which may be an external input, or selected from one or more stored other subject portions, such as human, animal, insect, alien, or "cyborg" bodies. The subject foreground image portion is then normalized in position and size, and optionally angle and 3-D orientation projection, and merged with the other subject body portion to created an anatomically appropriate entity.

The positioning information preferably comprises a single point, and the size information preferably comprises a single dimension. The first image, in such a case, is presumed to have a predetermined orientation of the first anatomical portion, i.e., the angle and 3D-orientation projection are already normalized to a sufficient degree. The second image is therefore one in which the desired orientation matches that of the first image. However, the positioning information may also include one or more vectors defining one or more additional degrees of freedom for normalization, the first image information, comprising information relating to a three or four dimensional representation of the first anatomical portion. Thus, the set of fourth representations relates to the positioning, scaling, movement, or other characteristics of the anatomical portion, and optionally orientation and other factors. The set of fifth representations therefore allows selection or synthesis of an appropriate first anatomical portion from the first image information.

The electronic representation of the first subject portion, e.g., head, may be a single image, multiple still images of differing orientations, a video input, or a special standardized input from a subject for acquiring full information about the subject. Therefore, the present invention allows various types of input sources to be used to define the subject. This flexibility is defined in a different production level than the "story line", although the type of electronic representation employed may be used to modify certain customization features. For example, if the input is a single still image, the audio track and corresponding image may reference the "stiffness" of the subject. Likewise, where a full model of a subject is created, the final multimedia production may include scenes including exploitation of, or verbal references to the ability of the computer to fully animate the subject.

Assuming that a full model of the subject is not obtained, the merging process may be a simple superimposition of the first image information defined by the fifth set of representations, or a more complex process, such as "morphing", which allows a gradual transition between two images, e.g., the first image and a portion of the second image. Where the electronic representation of the first subject portion is a model, the second portion is preferably also a model so that a simple or complex formula may be used to form the final image of the combined subjects.

The resulting image is preferably output to a video recording device and/or displayed on a video monitor.

The present invention therefore provides customized templates for adding an external image to a stored video sequence, resulting in a different production for each separate customized input set. Likewise, audio information may be used to customize a stored audio sequence, in conjunction with the video sequence. On a more sophisticated level, the input image information need not be limited to a single image, such as a photograph, and may in fact be obtained from a number of still images, individual frames or frame sequences from a videotape, or specialized imaging for the purpose of creating a computer model of the subject. Thus, a number of facial orientations, expressions and transitions may be captured explicitly for the purpose of creating the production. In this case, the first digital representations then include complex information, and the set of third representations includes not only the position and size of the portion of the subject, but the complex information as well. The set of fourth representations also includes an identifier of the desired complex information which is either included within the first image information or synthesized therefrom.

As noted elsewhere, the foreground image need not be directly derived from the first image, and may be "tweened", i.e., formed as an interpolated image from two different images, "morphed", i.e., provided with a gradual transition between two or more extremes, or altered before combining or superposing on the background image. Therefore, if the background image is the body of a lion, such as "Lion King", the face of a child may be captured and altered to include lion-like features. In other scenes, the background image may be of "Beauty and the Beast", where the child may be merged with one of the characters, being altered to include relevant, consistent features. Likewise, color mapping may also be altered to suit the production, allowing the subject to change color or shade in synchronization with the background.

Where a desired facial expression or orientation is not included in the first image information, it may be interpolated or extrapolated therefrom. Thus, the face image information may be mapped onto a three dimensional generic facial model, and then projected into different orientations. Further, facial features may be animated to produce facial expressions not included in the original data set(s). Thus, the information used to construct the final output image need not be limited to size and position, and may be a more complex vector with temporal variations. While it is preferable to obtain actual images of the subject rather than generating such images, both methods may be used.

Where available, video images including facial expression changes, such as between smile and frown, open and closed mouth, neck turning left and right and up and down, provides source material to produce more realistic images, allowing the image to "come to life" in the resulting video in a visually dynamic fashion.

According to one embodiment of the present invention, the final merging process occurs in real time. Therefore, it is preferred that before the final merging process occurs, all necessary preprocessing is completed, which may include interpolations, "morphing", modelling, "tweening" and the like. Certain tasks which are not completed in real time may be processed concurrently with the final merging process, so long as the tasks are assured to complete before the resulting data is required for merging. Thus, in a preproduction stage, images are input into the system and are parameterized and preprocessed, to extract the desired portion of the subject and position and scale it. Interpolation and digitization are also preferably performed in batch mode.

Interpolation between two different images of the same object may be performed by "tweening", a process wherein intermediate stages of transformation are created which maintain morphologically constant features and create a morphological "compromise" or intermediate for features which differ. For example, a transition between smiling and frowning may be partitioned into a number of intermediate stages in which the mouth and cheek morphology gradually changes from one extreme to the other.

The setup of batch mode processing may be quickly performed, allowing an operator to devote a limited amount of time to setting up a production and making any necessary decisions in a compressed amount of time. Thereafter, the production is automated, completing any batch mode processing and preceding to real-time recording or presentation of the production. This allows efficient utilization of manpower and high output. For sake of example, if 10 minutes are required to set up the batch processing, an additional 10 minutes to complete batch processing and finally 30 minutes to record the production, given sufficient hardware, a single operator will have a throughput of about six productions per hour.

The background image may be video, animated images, or still images. According to the present invention, the second image, or background image, includes the remaining portion of the subject. A further background image may also include external elements, and may optionally be integrated with the background image incorporating the remaining portion of the subject. For example, in a totally animated background, a single background image, including both the remaining portion of the subject and other elements is efficient. However, where the external elements are video images, and the remaining portion of the subject is animated, it may be preferable to treat the two background images separately. Thus, a plurality of background frames may be merged under computer control into a single video.

Likewise, the audio information may include three components, the custom audio insert, such as a name or other appropriate utterance, the audio template, and background audio, such as music or sound effects. These three components may be merged in real time during the production stage.

With a modular design of production, subject information from a variety of sources may be efficiently and optimally incorporated into the production. Thus, the first image may be one or more photographs, video, or taken directly at the production site from the subject itself. Music and voice may be included, as well, from previously prepared recordings or a microphone during batch processing preparation. Custom graphics and the like may also be optionally included.

According to an alternative embodiment of the present invention, the first image information of the subject is first processed to produce a cartoon image. This may be performed by a caricature or cartoon artist using standard materials, by an automated processor, or by an operator assisted automated processor. In creating a custom cartoon image, the anatomical integrity of the image should be maintained, so that the head portion may be successfully merged with the body portion during production. Thus, artistic freedom is limited to anthropomorphically appropriate elements and dimensions for proper computerized identification. The cartoon image process is advantageous because it allows simplified modelling of the subject without requiring photorealistic imaging of the natural subject. Mouth, eyes, nose, hair and eyebrows may all be modelled as three dimensional objects and controlled to move in real time, allowing fluid movements of the two dimensional projection of the character in the final production. The use of a human artist to abstract human facial features and create a caricature allows a high level of customization while providing means for standardization. Thus, certain features may be accentuated based on information not available in an image alone, resulting in an enhanced customized production.

When a human artist assists in capturing the features of the subject, a picture may be drawn, which is then scanned into a computer as the first image. Alternatively, the image may be created on a digitizing tablet. Further, the artist may work using a mouse or other input directly with a video image to construct the first image. The artist-created image is then employed directly or further processed by the computer, such as by being applied to a model cartoon character. When the artist works interactively with the computer to generate the first image, the data may be entered directly into a model, which may be directly animated, or have model parameters varied.

It is noted that, in many instances, the background image need not be employed as a digitized image, except for genlock (video scan synchronization) and overlay, at any point in the processing, and therefore in large part passes without distortion from a source to the production. This allows the background image to be stored on video tape, laser disk, or other analog storage medium. Of course, the background may also be stored as digital video, in uncompressed or compressed form, e.g., MPEG-2. Production synchronization may be by way of standard SMPTE timecodes. Thus, a custom cartoon character may be overlayed on external elements of a background.

In a preferred embodiment according to the present invention, audio information is provided, including both a first audio portion associated with the first image information and a second audio portion associated with the second image. A set of audio representations associated with the second image is used to determine the timing and optionally characteristics of information from the first audio information in a resulting soundtrack created by merging with the second audio information.

The first audio information may be, e.g., a name, spoken in various intonations, associated with the first image information. The second audio information may be, e.g., a story associated with a sequence of second images, with the set of audio identifiers relating to the timing and intonation of the name to be inserted in the soundtrack.

For a full understanding of the present invention, reference should now be made to the following detailed description of the preferred embodiments of the invention as illustrated in the accompanying drawings.

BRIEF DESCRIPTION OF THE DRAWINGS

The preferred embodiment of the invention will be shown by way of drawings of the Figures, in which:

FIGS. 5a and 5b depict image frames in which the head of a human subject has been enlarged and reduced in scale, respectively;

FIG. 6 depicts an image frame containing the body of a human subject, without a head;

FIG. 7 depicts an image frame in which the head of a human subject has been superimposed upon the body shown in FIG. 6;

DESCRIPTION OF THE PREFERRED EMBODIMENTS

Figure 1:
FIG. 1 is a diagram showing one frame of an image in which a boy's head is superimposed upon a hand-drawn boy's body.

The preferred embodiments of the present invention will now be described with reference to FIGS. 1–17. Identical elements in the various figures are designated with the same reference numerals.

FIG. 1 illustrates a typical electronically displayed image flame wherein the head 10 of a male child is superimposed upon a hand-drawn body 12. As may be seen, the head and body are in the proper relative proportions and the head is disposed upon the body at the proper location. This is the type of composite image which is automatically produced by the method and apparatus according to the present invention.

Figure 2:
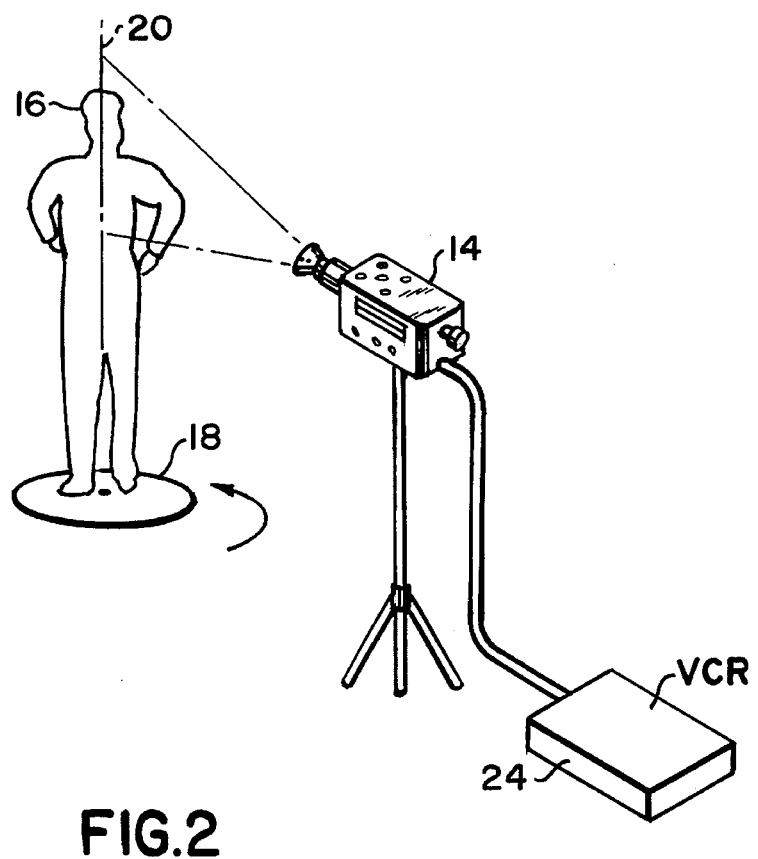
FIG. 2 is a perspective view showing how the head of a human subject, in various angular positions, is electronically scanned to produce a plurality of electronic images.

FIG. 2 illustrates how the head of a human subject can be scanned by an electronic scanner to form stored images. In this case, a video camera 14 is arranged to view the head 16 of the human subject. This human subject stands on a platform 18 which is rotated about a vertical axis 20. In this way, a plurality of video flames are obtained, each containing the image of the head 16 in a different angular position. These video flames are stored on a video cassette recorder (VCR) 24. The stored video flames may be thereafter digitized, in an analog-to-digital converter, to provide digital representations of each frame.

Alternatively, the video flames containing the image of a human head can be obtained flora a photograph of the human subject. For example, a Hewlett-Packard Scanjet® scanner may be employed to electronically scan a photograph and produce digital representations defining an image flame. Perspective views of the subject may be artificially generated from one or more views of the subject, by processing the electronically stored image based on a model of a human subject's head.

In order to provide special effects, the stored image may be "morphed" with another image for display. The process of "morphing" involves creating a series of morphologically defined interpolations between two corresponding images, with preservation of fluid continuity between corresponding features, i.e., edges, eyes, nose, mouth, neck, hair, etc. This allows, for example, a transition from a human head to an animal head. Alternatively, the stored image may be "tweened" with another image, forming an interpolation of the two images, which allows a more natural attachment and posture of a human head on an animal or other type body, and assists in animating the human head according to a predetermined choreography. In general, "morphing" or "tweening" will be performed in a batch processing mode prior to final production, although this is not required.

FIG. 16 shows two extreme images, and a series of interpolations between the two extremes. Each of the interpolations is a "tweened" frame, while the series of interpolations is a "morphed" sequence. In general, for presentation, a "tweened" frame is more carefully prepared from closely corresponding images, and all significant features remain defined, as these will be distinctly visible for a period of time. On the other hand, when presented as a series of frames, certain features in a "morphed" image may become momentarily indistinct during the transition, especially during dramatic transformations, as shown in FIG. 17.

EXAMPLE 1

Figure 3:
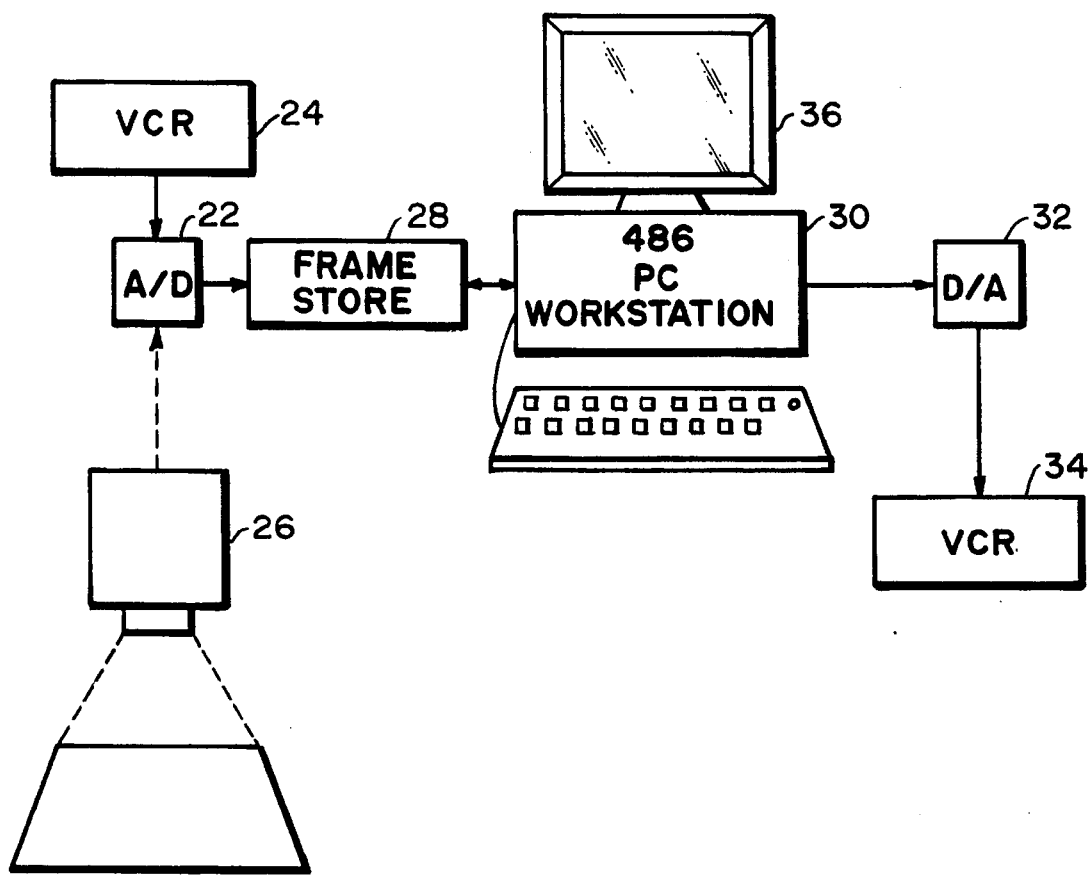
FIG. 3 is a block diagram of an electronic system employed, according to the present invention, to produce electronic images of the type shown in FIG. 1.

FIG. 3 illustrates a first apparatus employed for implementing the image-making method according to the invention. As is shown there, the system comprises an analog-to-digital converter 22 which can receive video image frames from the video cassette recorder 24 or digitizes images in a flat bed scanner 26. The flat bed scanner 26, which may, for example, be a Hewlett Packard Scan Jet® or Sony flat bed scanner, electronically scans an image, e.g., 8½×11 inch hand drawn art work or an 8×10 inch photograph.

The digital representations of each image frame are supplied to a digital image frame store 28 which, in turn, is addressable by an IBM compatible 80486DX2/66 personal computer (PC) workstation 30. Of course, Intel Pentium®, Apple Power PC, or other processors are known which may be employed for image processing. The frame store is preferably an IBM rewritable optical disk, although a magnetic disk, RAM or other type of memory may be used to store the image frames. The PC workstation 30 is provided with a video adapter, such as is available from Targa Systems, Inc. of East Berlin, Conn., USA, under model name "True Vision Targa Plus 64 Board", for displaying television images on the workstation CRT screen 36 from digital representations of such images.

The image frames composed by the PC workstation 30 are supplied in digital form to a digital-to-analog converter 32 which, in turn, passes the analog signal to a VCR 34 or other video recording device.

The PC workstation 30 operates with two applications programs namely, AVS 4000 and AVS 5000, which are also available from Targa Systems, Inc. These programs, which may be used to implement the method according to the present invention for automatically superimposing the head of a human subject on a body contained in an image frame, will now be described in detail.

Figure 4A:
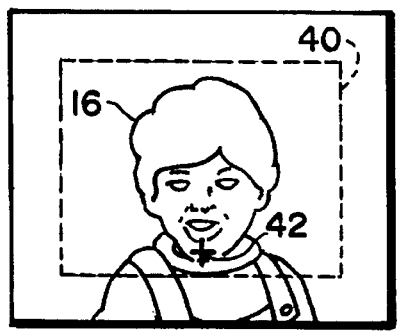
FIGS. 4a and 4b are image frames containing the head of a human subject in front and side views, respectively, as may be obtained with the apparatus of FIG. 2.
Figure 4B:
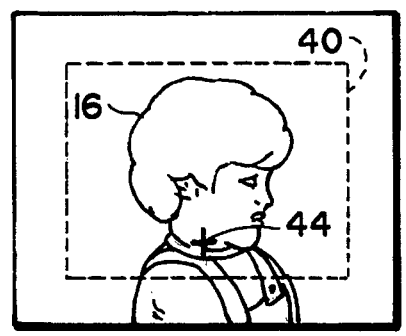

As shown in FIGS. 4a and 4b, the image of a human head is initially electronically scanned and then digitized, and a set of first digital representations defining a first image frame are stored in the frame store 28. The operator of the PC workstation 30 next displays the image of the head 16 on the workstation CRT screen 36 and selects a suitable frame size 40 for the image. In addition, the workstation operator selects a reference point on the first image frame 40 which indicates the location of the head with respect to the frame. This reference point is preferably a central point at the bottom of the chin, in the case of a full-face view, and a central point at the top of the neck in the case of a side view. These reference points are shown as points 42 and 44, respectively, in FIGS. 4a and 4b.

As a next step, the workstation operator causes the workstation to scale the image of the head, and produce and store digital representations of the head in a plurality of sizes, as shown in FIGS. 5a and 5b. Digital representations associated with each stored frame also define (1) the location of the reference point 42, indicating the location of the head on this frame, and (2) the size of the head in this first frame.

Previously scanned, e.g., by the flatbed scanner 26, and entered into the frame store 28, are digital representations of a picture containing the body of the human subject. The image frame containing this body is also displayed on the CRT display by the operator of the PC workstation. By observing the image, the operator produces a set of digital representations associated with this image frame defining (1) a reference point 46 on the frame 44 specifying the desired location of the head on this frame, (2) the desired size of the head on this frame 44.

Thereafter, the operator superimposes the image frame 40 containing the human head 16 in the desired size upon the image frame 44 with the reference point 42 superimposed upon the reference point 46.

Finally, the superimposed images, so generated, are supplied to a digital-to-analog converter which converts the image to a single frame in NTSC format which is then recorded on a VCR 34.

Figure 8:
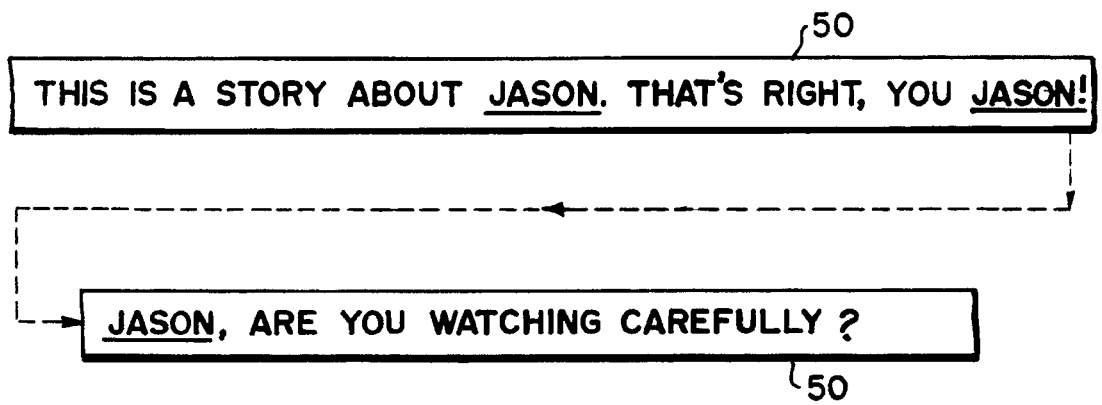
FIG. 8 is a representative diagram of a voice recording showing how the name of a person is inserted into a line of text.
Figure 9:
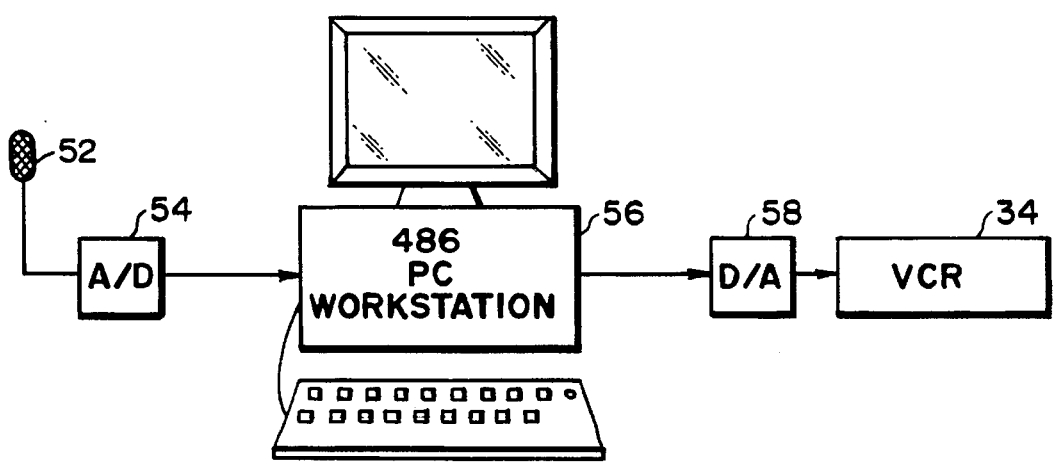
FIG. 9 is a block diagram of the an electronic system, according to the invention, for inserting the name of a person in a voice recording.

FIGS. 8 and 9 illustrate how a voice recording may be generated to provide a custom tailored soundtrack for a video recording. In this example, digital representations of the name of a human subject, "JASON", is inserted in a pro-recorded and digitized soundtrack.

FIG. 8 represents an excerpt from a magnetically recorded soundtrack 50. According to the present invention, the word "JASON" with the proper intonation, is inserted at the beginning and end of pre-recorded sentences.

FIG. 9 is a block diagram showing an apparatus for implementing the method. This system comprises a microphone 52, analog-to-digital converter 54, a PC computer workstation 56, a digital-to-analog converter 58 and the VCR 34. The PC workstation 56 contains an IBM audio capture and playback adapter with associated software.

The method of producing the voice recording of FIG. 8, with the aid of the apparatus of FIG. 9, will now be described.

Initially, the text of the voice recording, without the inserted name, is spoken into the microphone 52. This text is recorded in digital form on the hard disk memory of the PC workstation. Thereafter, the name of a human subject, e.g., "JASON", is spoken into the microphone 52 with three different intonations: declaratory, exclamatory and interrogatory. These sounds are also digitized and stored on the workstation hard disk.

Preferably, an entire library of names is so recorded on the workstation hard disk for later use. Of course, different names may be synthesized by a computer system based on the pronunciation of the name and a voice synthesis algorithm. The audio sound track may also be processed on an Apple Macintosh computer with sound capability.

When a video cassette recording is made, the audio data is automatically supplied via the digital-to-analog converter 58 to the VCR 34. Personal names, e.g., "JASON", with a proper intonation, are inserted in this audio data stream on the fly. If the name is to be added at the end of a sentence, digital representations thereof are added "flush left", i.e., with a variable length sound gap between the end of the sentence and the beginning of the next sentence; if it is to be inserted at the beginning of a sentence, the digital representations are added "flush right", i.e., with a variable length gap before the name, so that the sentence will sound "natural" in reproduction. The name may also be embedded in the sentence, with variable length gaps at pauses within or at the beginning and/or end of the sentence.

EXAMPLE 2

Figure 10:
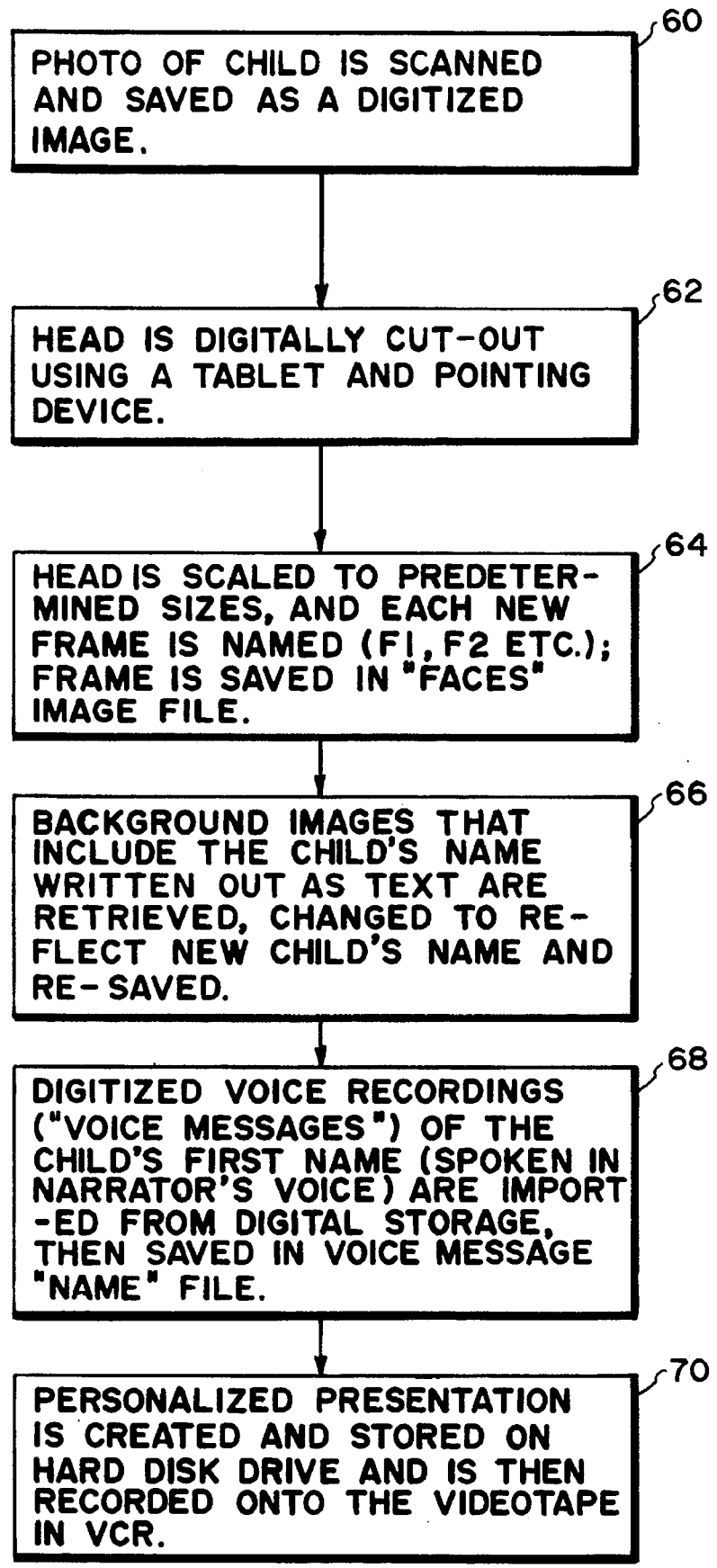
FIG. 10 is a flow chart of a computer program for implementing the electronic image producing process in the apparatus of FIG. 3.

As illustrated in FIG. 10, the video and audio "personalization processes", respectively, according to the invention are carried out as follows:
Video Personalization:
First, a photograph of a child (any size) which includes a child's head—e.g., in full face view—is scanned using a color video scanner. That digitized image is saved using the Targa AVS 5000 software on a 486 PC workstation. (Block 60).

After being saved, the image of the child's head is digitally "cut-out" using a computer tablet and the tablet's pointing device. The cutting-out is accomplished by tracing the edge of the child's head with a light pink line. This shade of pink has the ability to blend the edges of the child's head with the background colors in other illustrations or scenes ("background images"). (Block 62).

The cut-out head is saved after pink pixels are added to the corners of the image ("foreground image"). These pixels are added because the heads are ultimately justified against the background images according to the bottom left-hand corner of the foreground image, and the pixels in the corner prevent differently oriented and sized heads from being automatically positioned incorrectly relative to the position of the illustrated body in the background image.

Next, using the PC workstation, the scanned-in head is automatically scaled to up to 30 different sizes, from small to large, each of which is saved as an individual foreground image with a distinct name (F1, F2, F3, etc.) to produce a file called "Faces". The head is in some cases also flipped (mirror imaged) and/or rotated. (Block 64). Of course, with sufficiently powerful computing hardware, these images may be scaled "on-the-fly".

As a next step, using the PC workstation, the proper foreground image (F1, F2, F3, etc.) is retrieved from the file "Faces" and superimposed automatically upon the next successive background image of a video story (ABC1, ABC2, ABC3, etc.) at its proper location. Thereafter, the combined image is stored on a hard disk or directly to a video storage device, such as a VCR.

The first name of the person shown in the Faces file is written out as text and this text is inserted in those background images (ABC1, ABC2, etc.) that include the child's name. (Block 66).

The presentation ("story") is now recorded from the hard drive of the PC workstation to a videotape (or other possible media in the future). The story consists of a sequence of video and audio elements (images, voice messages, music) that are played in a predetermined order to create the story. In that sequence, the background images with the superimposed heads will appear in their predetermined places to create a personalized videotape. (Block 70).
Audio Personalization:
An audio file called "Names" is first produced, containing digitized recordings of the various names spoken by a voice artist. (Block 68). Of course, a computer synthesized voice may be used, especially if it is tuned to sound human.

When the presentation is created, the appropriate name is inserted at the predetermined point in the story. The name is "justified", either right or left, so that it will be naturally spoken in the context of the sentences in which it appears, with no unwanted pause between the name and preceding or subsequent words, or at other portions of the soundtrack, and so that the soundtrack remains in synchronization with the video sequence. (Block 70).

Figure 11:
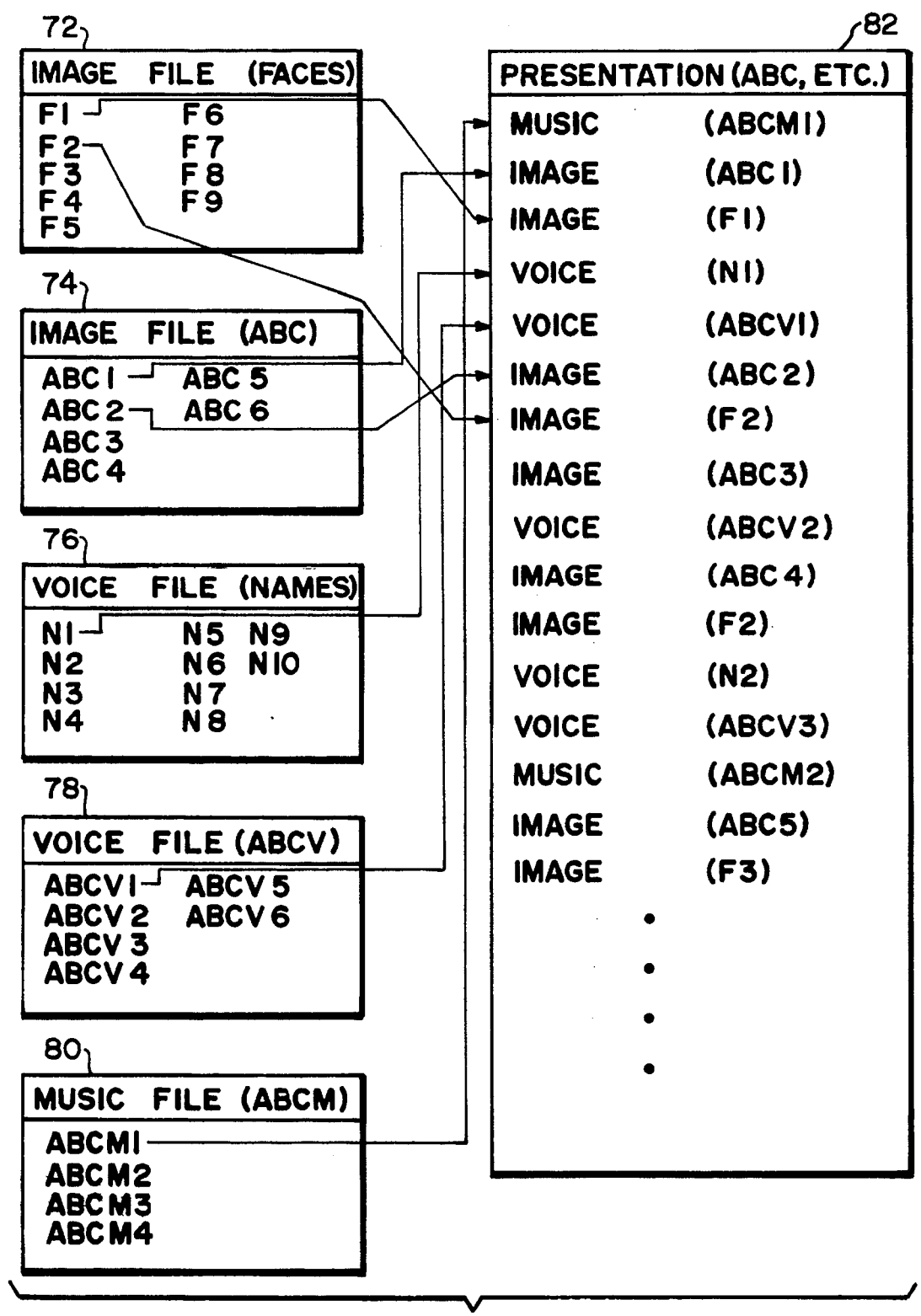
FIG. 11 is a flow chart of a computer program for implementing the audio recording process in the apparatus of FIG. 9.
Figure 12A:
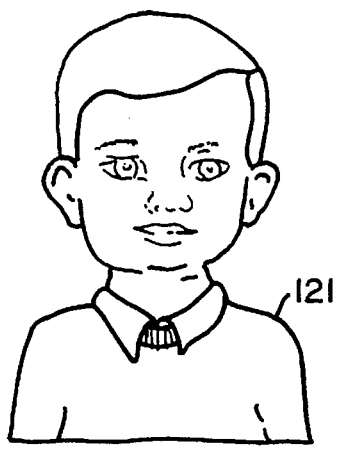
FIG. 12 is a graphical flow chart depicting the transformations according to the present invention.
Figure 12B:
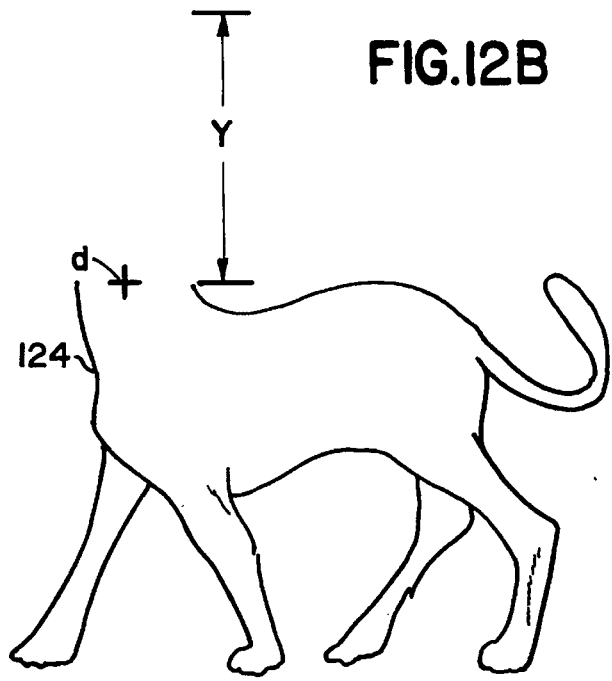
Figure 12C:
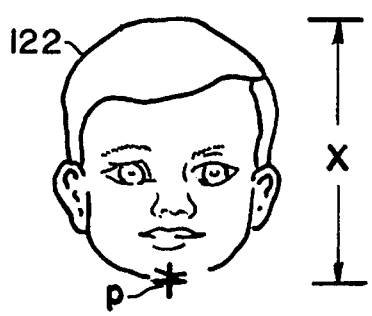
Figure 12D:
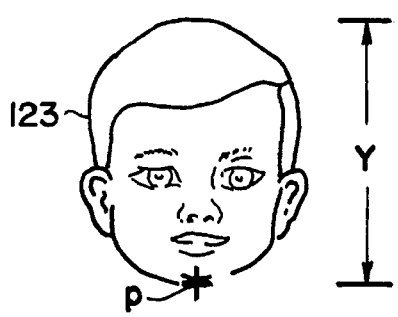
Figure 12E:
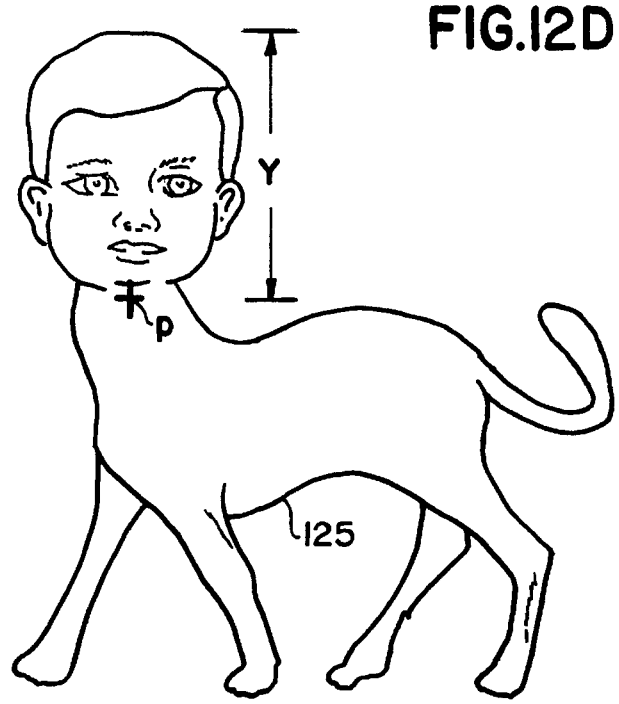
Figure 13A:
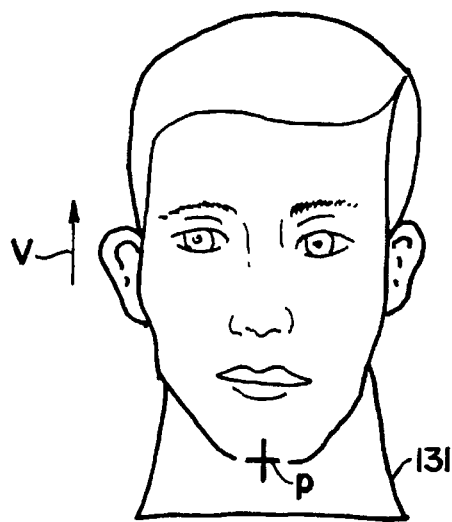
FIG. 13 depicts images having differing positioning.
Figure 13B:
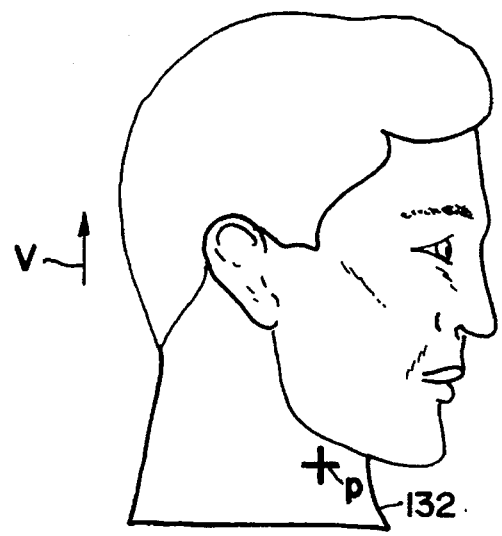
Figure 13C:
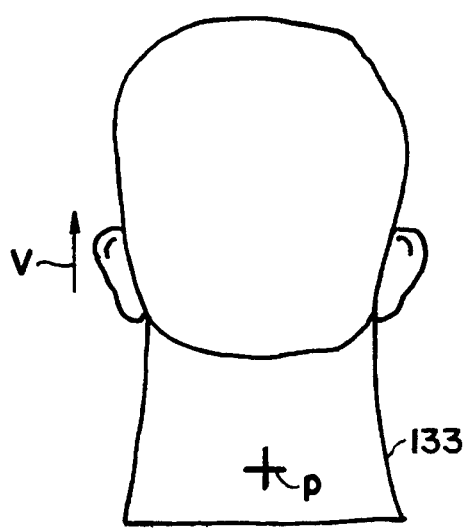
Figure 13D:
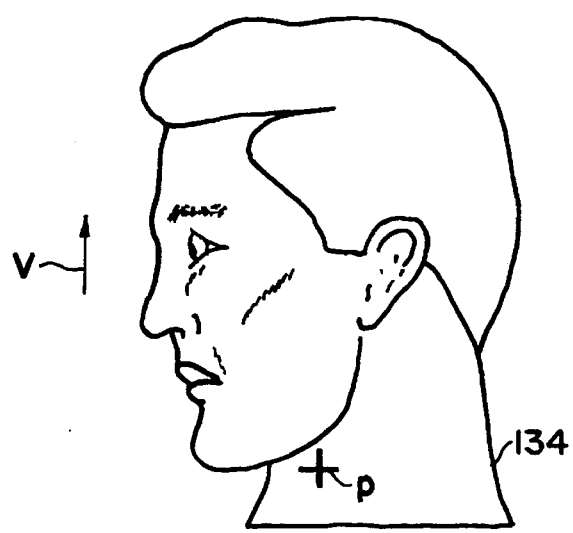
Figure 13E:
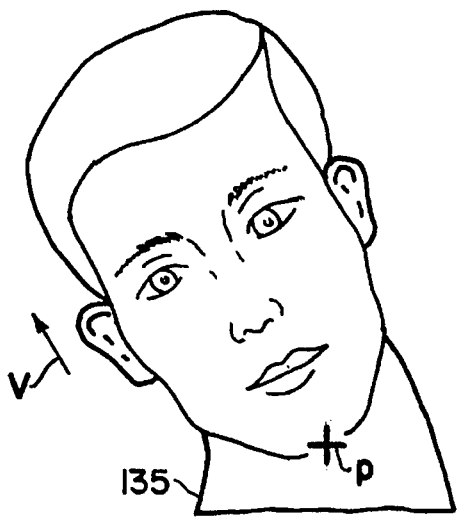
Figure 13F:
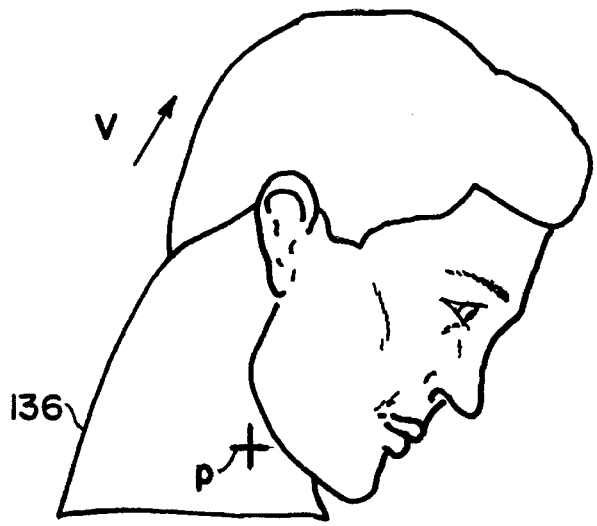
Figure 13G:
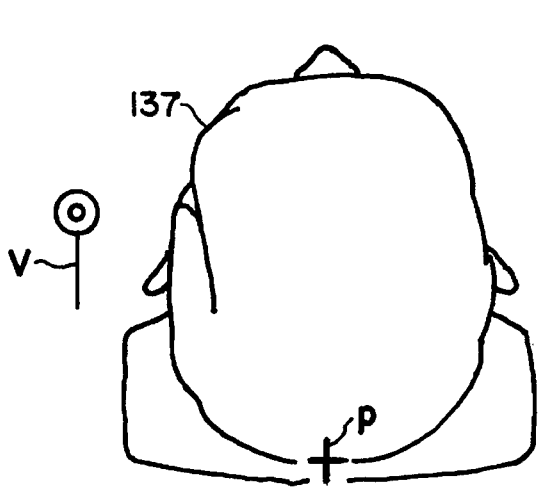
Figure 13H:
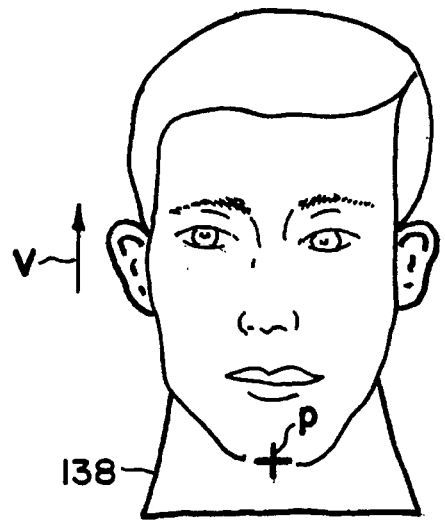
Figure 14:
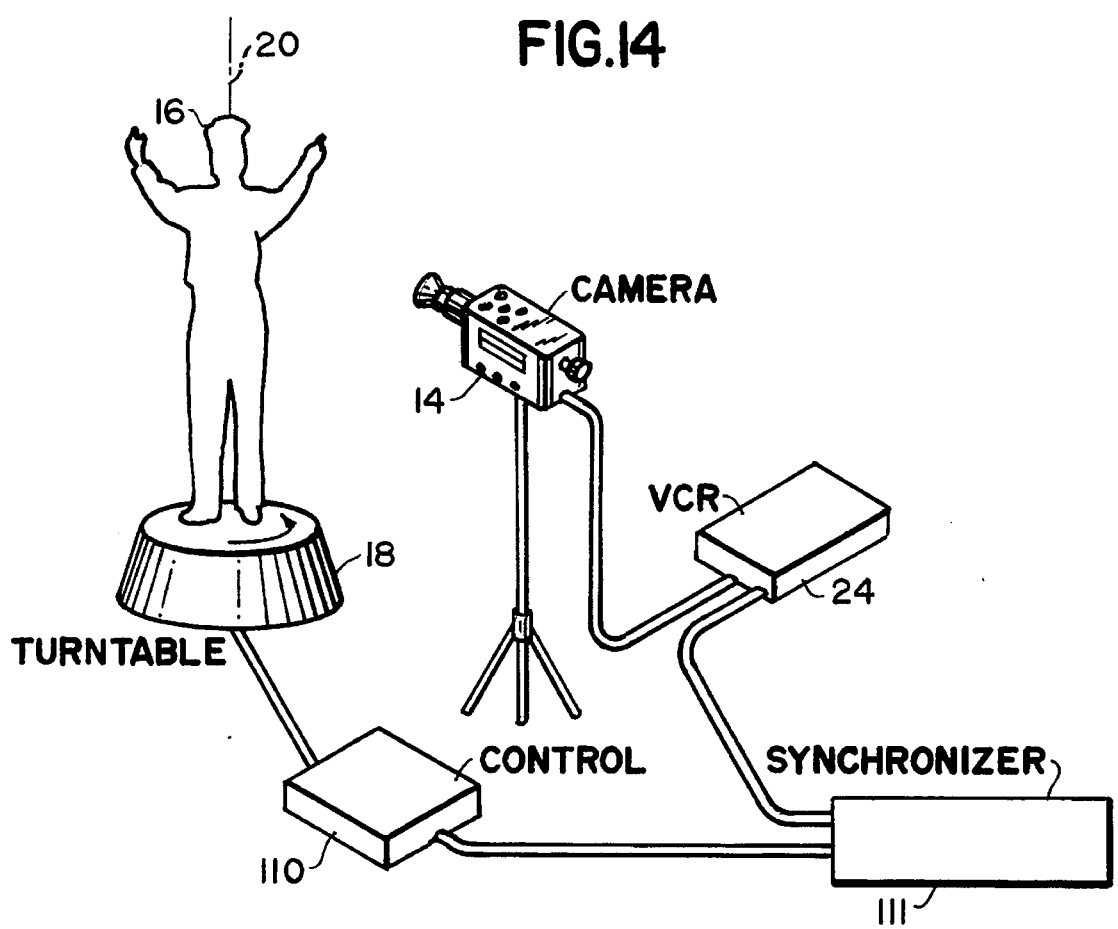
FIG. 14 is a semi-schematic view of an apparatus for obtaining customization information.
Figure 15:
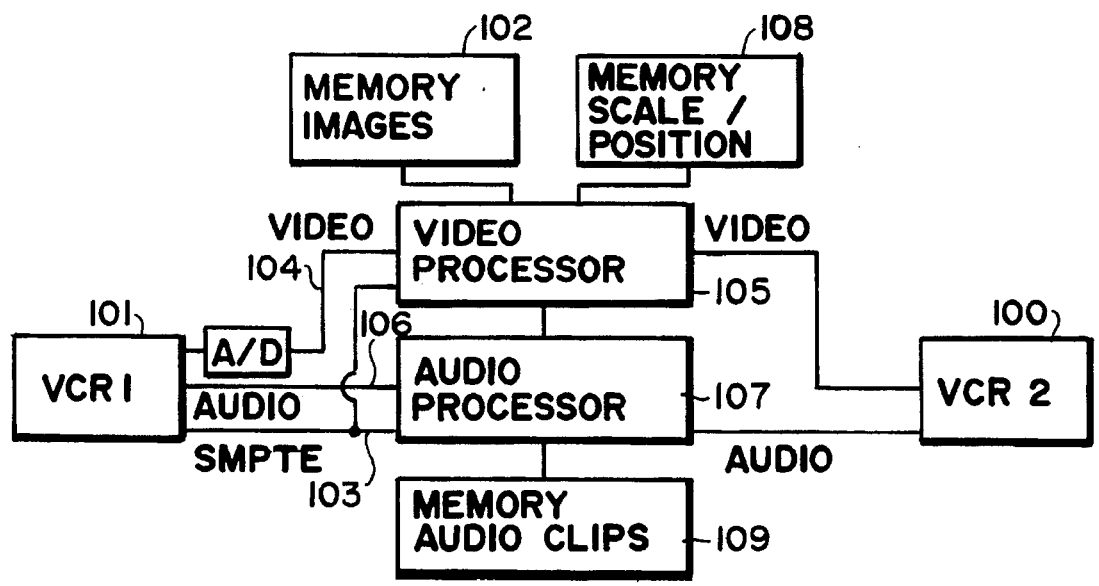
FIG. 15 is a block diagram of an embodiment according to the present invention.
Figure 16A:
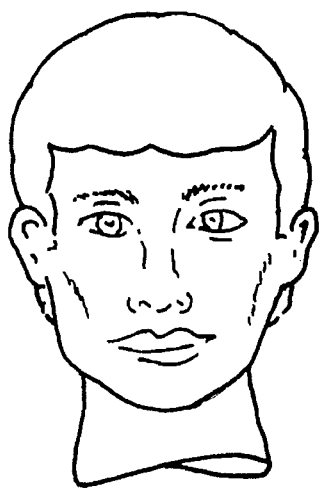
FIG. 16 depicts two images with "tweened" frames, which if presented dynamically, provide a "morphed" image.
Figure 16B:
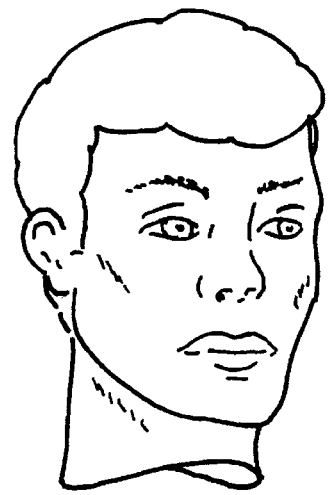
Figure 16C:
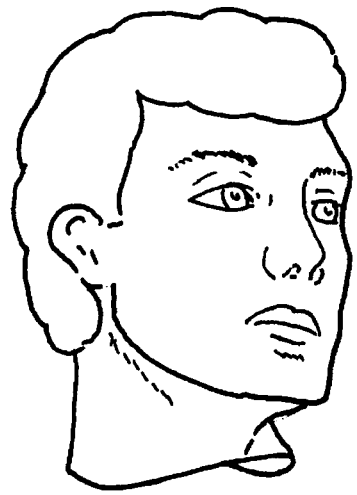
Figure 16D:
Figure 16E:
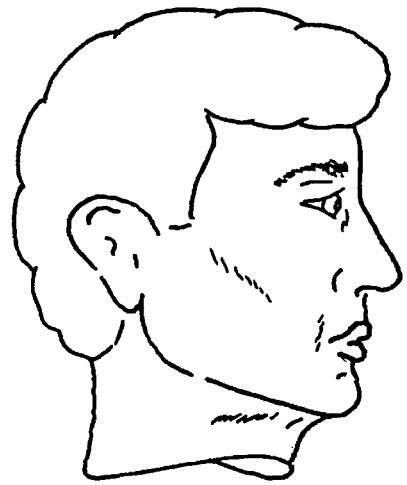
Figure 17A:
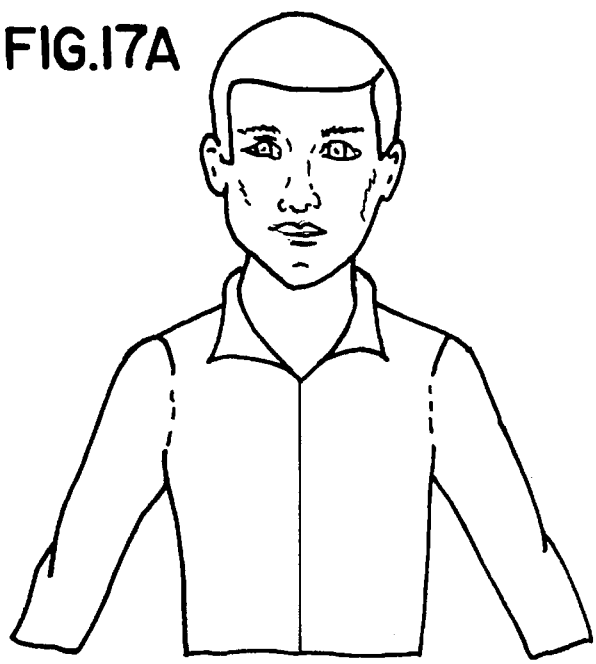
FIG. 17 depicts a starting and ending frame of a "morph" transition, with several interframes.
Figure 17B:
Figure 17C:
Figure 17D:
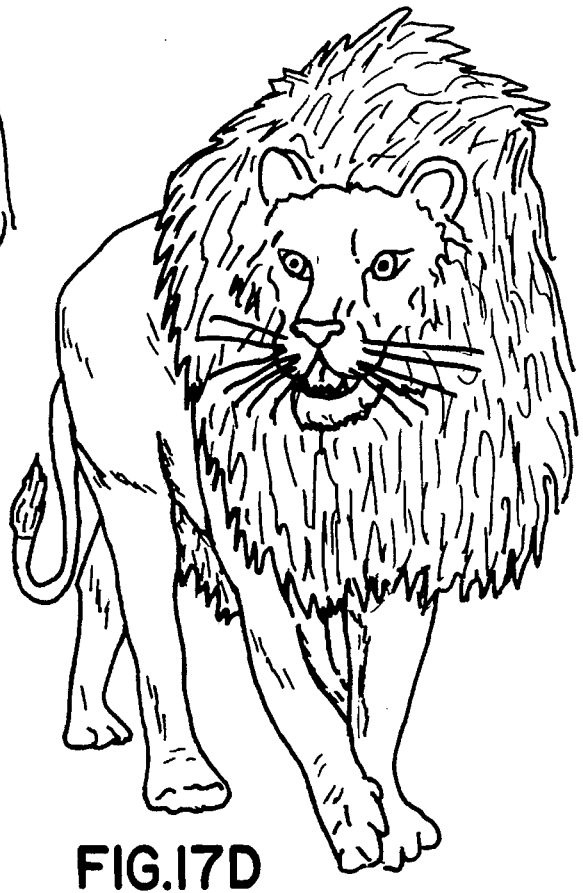

FIG. 11 illustrates how the personalized presentation is created (Block 70) from the files of digital representations containing the foreground images ("Faces") 72, the background images ("ABC") 74, the voice file for "Names" ("N") 76, the voice file for narrative ("ABCV") 78 and the music file ("ABCM") 80. As explained above, the video presentation is created by superimposing the correct image of a head (F1, F2, F3, etc.) on successive background images ABC1, ABC2, ABC3, etc.

The audio presentation is created by superimposing digital representations of the names N1, N2, N3, etc. over the voice file ABCV1, ABCV2, ABCV3, etc. In addition, successive digital representations from the music file ABCM1, ABCM2, ABCM3, are supplied at proper intervals.

There results a presentation file 82 which is stored on the hard disk and then "played" through the digital-to-analog converter to a VCR to produce a videotape.

EXAMPLE 3

In contrast to the system described in examples 1 and 2, an alternative system is provided which allows the production to occur in real time and be synthesized, sequenced and directly recorded on a video tape 100 or other video recording device.

Thus, according to this embodiment, a source background video sequence may be provided on a master videotape, in a video tape player 101. In each frame, a foreground image is supplied from a library of images in memory 102, which may include images varying in perspective, size, action (e.g., mouth open, mouth closed, eyes open, eyes closed, smiling, frowning, etc.), lighting, or other characteristics. The image library may also be supplemented with synthesized images, which are interpolated or extrapolated from actual images.

The source background video sequence is coded with SMPTE time codes 103, and may also have other associated information. For example, a close-captioned signal may be included with the audio text, and information regarding the optimum location and orientation of the image.

The source background video image 104 is fed to a 486 PC computer 105 with a modified Television Laboratories Director Turbo system video processor. This video processor allows the facial image to be scaled, rotated and placed in real time on the background video image. The sequence of foreground images is determined by a predetermined program keyed to the SMPTE time codes 103. Therefore, the processing of the foreground image proceeds in sequence, through a series of selections and transformations of the foreground image data.

The audio track 106 is processed by an Apple Macintosh computer 107. Based on a preprogrammed sequence, the SMPTE time codes 103 from the background video sequence control the audio system. At selected chronological locations within the audio sequence, the name of the child is inserted, with the proper intonation and timing. Based on the linguistic relationship of the inserted name, which will have a variable duration, to the remainder of the audio track, which will have a fixed timing, gaps may be added or reduced to maintain the appropriate synchronization. If close caption signals are provided, these may be updated with the child's name as well.

The fixed audio track is preferably recorded on an audio tape, separate from the source background video signal, with only the variable portion, i.e., the child's name, provided by the Apple Macintosh. Of course, the entire audio sequence, including both the fixed and variable portions, may be provided by the audio subsystem, separate from the video source, especially where more complex variable portions are provided, wherein the final production is provided based on the SMPTE time codes, synchronizing the audio and video in the layback process.

The SMPTE code may be either a longitudinal time code (LTC) or a vertical interval time code (VITC), although the LTC is preferred.

The library of images, stored in memory 102, of the human subject as the foreground image may also be interpolated with the background video image sequence, although this is not generally performed in real time, i.e. the interpolated background image cannot generally be directly transferred to the output videorecorder at about 30 frames per second, but rather at a much slower rate due to processing delay.

In the "morphing" or "tweening" process, the foreground human subject image, i.e., the facial image, is coded by hand or through an automated feature coding system, to identify the desired anatomical features such as eyes, ears, nose, mouth, hair, and the like as anchors for the interpolation process. The subject source background image is precoded for corresponding features, and preferably separated from other background elements. During the pre-production process, frames with the subject foreground and subject background images are interpolated, either in a fluid transition, i.e., "morphed", or as a hybrid, i.e., "tweened", in a manner which primarily preserves the characteristics of the subject foreground image for the primary facial features, and which preserves distinctive contextual subject background features, so that the resulting image is identifiable as the original subject, with morphological modifications. The interpolated images are then stored and merged with the background image during final production.

Further, the foreground image may be altered in expression, and, for example, lips from a still image may be made to appear to move.

It is also possible to perform an image interpolation in real time, so that the foreground subject image is merged with the background subject image during the final production; however, this requires a great amount of processing power.

EXAMPLE 4

The method according to example 3 is implemented as follows:

First, an sequence of images of a human subject head is obtained by means of a video camera 14 or other electronic imaging system. These images differ in orientation and positioning, an a manner which is recorded in conjunction with the image. Therefore, a desired positioning and orientation for a cohesive match with the background image may be obtained by selecting the closest image actually obtained, which may then be further transformed by linear scaling, interpolation, or other processing. The subject stands on a turntable 18, which turns about axis 20. The rotation of the turntable 18 is controlled by a control 110, which is interfaced to a synchronizer 111, which also synchronizes a videotape recorder 24, which receives a signal from a videocamera 14, directed at the head 16 of the subject.

The human subject head is then separated from the remaining features either automatically or manually. For example, if the images are obtained in front of a blue screen, a chroma-key unit may be used to provide a transparent margin for the foreground image. Alternatively, the edge of the head may be traced by an image processing algorithm to remove the remaining external features. The separation may also be performed manually, as described above with respect to examples 1 and 2.

A unique positioning may be automatically determined for each image, e.g. 131–138, for example by determining a central axis v and a point p, i.e., the lowest portion of the face, the chin, as shown in FIG. 13. The size or scaling of the head may also be determined by measuring a distance from the bottom to top of the head, i.e., along the central axis, and relating this distance to a standard, as depicted in FIG. 12. In FIG. 12, a foreground image 121 is separated into a head portion 122. A point p is determined which defines a positioning of the head 122. The scaling of the head 122 is also determined by measuring a characteristic dimension x. The characteristic dimension x is related to a desired dimension y and the head rescaled to a new head image 123. The background image 124 defines a background, as well as a desired positioning d and the desired scaling. The scaled foreground image 123 is merged with the background image 124 by superposing the scaled head 123 with the defined point of the scaled head 123 coinciding with the desired positioning d.

The positioning and scaling may also be manually determined, in accordance with the above description with respect to examples 1 and 2.

A background graphic sequence is provided, preferably on an SMPTE encoded videotape. A corresponding file includes information relating the SMPTE codes with desired positioning and scaling of the foreground image. The background image is then fed to a video processor, e.g., the aforementioned Television Laboratories Director Turbo system, where it is digitized and temporarily stored in a frame buffer. The video processor receives a selected foreground image, which is then scaled and positioned in real time. The foreground image is overlayed on the background image and output from the video processor as an NTSC signal, which is recorded on a video recorder.

Simultaneously with the video processing, the SMPTE codes are used to determine an audio track. A constant audio track is provided in synchronization with the background video. The SMPTE codes are fed to a Macintosh computer, which is preprogrammed to relate the sequence of audio information. At particular times, a variable audio portion, i.e., a name, is inserted in the audio track. The predetermined sequence also includes information regarding the placement of the variable portion within the allotted timespace. Thus, the variable audio may be placed at the beginning, end, or middle of the timespace. The variable audio portion and the fixed audio portion are then mixed and recorded with the composite video on the video cassette recorder.

Of course, it should be understood that sequences of video buffer frames may also be present around the time occurrence a variable speech portion. Therefore, the length of the gap between fixed audio portions may be varied by truncating frames or by providing interpolated frames in the variable time portion, so that variable length sound gaps need not occur.

There has thus been shown and described a novel method and apparatus for producing an electronic image which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of producing an electronic image of a subject, said method comprising the steps of:
   (a) electronically inputting a first image of at least a portion of said subject and storing a set of first digital representations defining said first image in a foreground electronic image frame;
   (b) generating a plurality of second images of a picture containing a remainder portion of said subject and storing a plurality of sets of second digital representations, each set defining one of said second images in a background electronic image frame;
   (c) producing a set of third digital representations associated with said foreground frame defining (1) a first reference point on said foreground frame indicating the location of said subject portion in said foreground frame, and (2) the size of said subject portion in said foreground frame;
   (d) producing a set of fourth digital representations associated with each of said background frames defining (1) a second reference point on each respective background frame specifying the desired position of said subject portion in said background frame, and (2) the desired size of said subject portion in each respective background frame;
   (e) converting said set of first representations of said first image into a plurality of sets of fifth representations, in dependence upon the size information defined by said set of third representations and said plurality of sets of fourth representations, each set of said fifth representations defining said foreground frame with said subject portion scaled to said desired size and located at said desired position in a respective one of said background frames;
   (f) combining said set of fifth representations defining said foreground frame upon said set of second representations defining said background frame such that said first and second reference points substantially coincide, to produce a plurality of sets of sixth digital representations, each defining a respective final electronic image frame containing said subject portion disposed upon said remainder of said subject at said desired position and with said desired size; and
   (g) storing said plurality of said sets of said sixth digital representations to provide a sequence of said final frames.

2. The method according to claim 1, further comprising the steps of:
   (h) storing a sound sequence associated with said sequence of final frames; and
   (i) producing a video recording comprising said sequence of final frames and said associated sound sequence.

3. The method according to claim 2, further comprising the step of producing an audio recording associated with said third image as said sound sequence, said recording including a sequence of seventh digital representations defining the sound of spoken words.

4. The method according to claim 3, wherein said audio recording producing step includes the step of inserting into said sequence of seventh digital representations a set of eighth digital representations defining the sound of a spoken word or phrase.

5. The method according to claim 4, wherein said word or phrase is a name.

6. The method defined in claim 4, wherein said set of eighth digital representations defining said spoken word or phrase is selected from a plurality of sets of eighth digital representations.

7. The method defined in claim 6, wherein said set of eighth digital representations defining said spoken word or phrase is selected from a plurality of sets of eighth digital representations, each set defining a spoken word or phrase which differs in meaning or intonation.

8. The method according to claim 4, wherein said sequence of seventh representations defines a phrase having a beginning and an end; wherein each member of said set of eighth representations has a beginning and an end; and wherein the beginning or end of said set of eighth representations is inserted at the end or beginning of a phrase of said sequence of seventh representations, respectively.

9. The method according to claim 1, wherein said plurality of second images define a motion video sequence.

10. The method according to claim 1, wherein said plurality of second images define a series of discontinuous backgrounds.

11. The method according to claim 1, wherein said plurality of second images contain varying pictures containing a remainder portion of said subject.

12. The method according to claim 1, wherein the first image includes a photograph of a head portion of said subject.

13. The method according to claim 1, wherein said subject is anthropomorphic.

14. The method according to claim 1, wherein said remaining portion of said subject represents an animal.

15. The method according to claim 1, wherein the first image includes an image of a human head.

16. The method according to claim 1, wherein the second image includes an illustrated drawing of said picture.

17. The method according to claim 16, wherein said drawing contains brilliant colors.

18. The method according to claim 1, wherein said first image includes a head and said second image includes a body portion having a collar immediately adjacent a desired location of said head of said first image.

19. The method according to claim 1, wherein said first image includes a head having a chin, and wherein the first reference point in said first image is located substantially on said chin.

20. The method according to claim 1, wherein said first image includes a head having a neck, and wherein the first reference point in said first image is located substantially on said neck.

21. The method according to claim 1, further comprising the step of superimposing a soft pink border around said subject portion of said first image.

22. The method according to claim 1, wherein said converting step comprises the steps of:

producing a plurality of sets of said fifth representations, with each set of said fifth representations defining said portion of said subject scaled to a different given size with respect to said first frame; and selecting one set of said fifth representations in dependence upon the size information defined by said fourth representations.

23. The method according to claim 1, wherein:

said electronically inputting step includes the steps of repeatedly electronically scanning a plurality of first images of said portion of said subject thereby to produce a plurality of sets of said first digital representations, with each set of said first representations defining said portion of said subject in a different angular position with respect to a vertical axis;

said sets of third and fourth representations further define, respectively, the angular position of said portion of said subject in each of said first and second frame; and further comprising the step of selecting one set of said first representations in dependence upon said desired angular position of said portion of said subject defined by said fourth representations.

24. A method of producing a composite electronic image of a subject, said method comprising the steps of:

(a) obtaining first image information relating to a first anatomical portion of a subject and producing a set of first representations of the first image;

(b) obtaining second image information relating to a second anatomical portion of a subject and producing a set of second representations of the second image defining a plurality of second image frames, the first anatomical portion being for placement adjacent the second anatomical portion;

(c) producing a set of third representations associated with the first image information defining (1) a first reference indicating a positioning of the first anatomical portion, and (2) a size of the first anatomical portion;

(d) determining a set of fourth representations associated with the plurality of second frames defining (1) a second reference on each of said second frames specifying the desired positioning for the first anatomical portion in said respective second frame, and (2) the desired size for the first anatomical portion in said respective second frame;

(e) converting the set of first representations of the first image into a set of fifth representations, in dependence upon the third and fourth representations, the fifth representations defining the first anatomical portion scaled to the desired size and with the desired positioning;

(f) merging the set of fifth representations with the set of second representations defining a respective second frame such that the first and second references substantially coincide, to produce a set of sixth representations defining a respective second image frame comprising the first anatomical portion disposed adjoining the second anatomical portion with the desired positioning and of the desired size; and (g) outputting the respective second image frame from the set of sixth representations.

25. The method according to claim 24, wherein said first anatomical portion is a head and the second anatomical portion is a body.

26. The method according to claim 25, wherein said first and second anatomical portions are derived from different subjects.

27. The method according to claim 24, wherein said first image in formation is obtained through a video camera.

28. The method according to claim 24, wherein said first image information is obtained from scanning one or more still pictures.

29. The method according to claim 24, wherein said plurality of second images comprise a series of images selected from the group consisting of an animated sequence, a videotape, a series of still scenes, and a computer generated image sequence.

30. The method according to claim 24, wherein said second images preferably comprise an anatomical adjoining part which allows normal appearing placement of the anatomical part of the first image.

31. The method according to claim 24, wherein said second images comprise an anatomical adjoining part having a buffer zone which obscures misalignment or other visual artifacts from the merging process.

32. The method according to claim 24, wherein said positioning information comprises a single point, and said size information comprises a single dimension.

33. The method according to claim 24, wherein said positioning information comprises a vector, the first image information comprising more than two dimensional information relating to said first anatomical portion.

34. The method according to claim 24, wherein said merging process comprises a process selected from the group consisting of superposition, interpolation, and combination of said first image information defined by the fifth set of representations, on said second frame defined by said second representations.

35. The method according to claim 24, further comprising the steps of associating a first set of audio representations defining audio information with said first image information, associating a second set of audio representations defining audio information with said plurality of second images, said merging step further comprising combining said first audio and second audio sets of representations to produce a third set of audio representations defining a composite audio track and said outputting said composite audio track.

36. A method of producing an electronic image relating to a human subject, said method comprising the steps of:

(a) electronically scanning a first image of a head of said subject and producing a set of first digital representations of said first image defining a first electronic image frame;

(b) generating a plurality of second images containing a body for said subject and producing a set of second digital representations of said plurality of second images defining a plurality of second electronic image frames;

(c) producing a set of third digital representations associated with said first frame defining (1) a first reference point on said first frame indicating the given location of said head in said first frame, and (2) the size of said head in said first frame, (d) producing a set of fourth digital representations associated with each of said plurality of second frames each respectively defining (1) a second reference point specifying a desired location of said head in said second frame, and (2) a desired size of said head in said second frame;

(e) converting said set of first representations of said first image into a set of fifth representations, in dependence upon the size information defined by said third and fourth representations, said fifth representations defining said first frame with head scaled to said desired size and located at said given position;

(f) merging said set of fifth representations defining said first frame width said set of second representations defining said plurality of second frames such that said first and second reference points substantially coincide, to produce a set of sixth digital representations defining a plurality of third image frames of a picture containing said head dynamically disposed upon each of said body portions of said second images at said desired location; and (g) outputting said plurality of third image frames from said set of sixth representations.

* * * * *